April 8, 1924.
C. J. GEISER
AMUSEMENT DEVICE
Original Filed Sept. 28, 1922  2 Sheets-Sheet 1
1,489,701
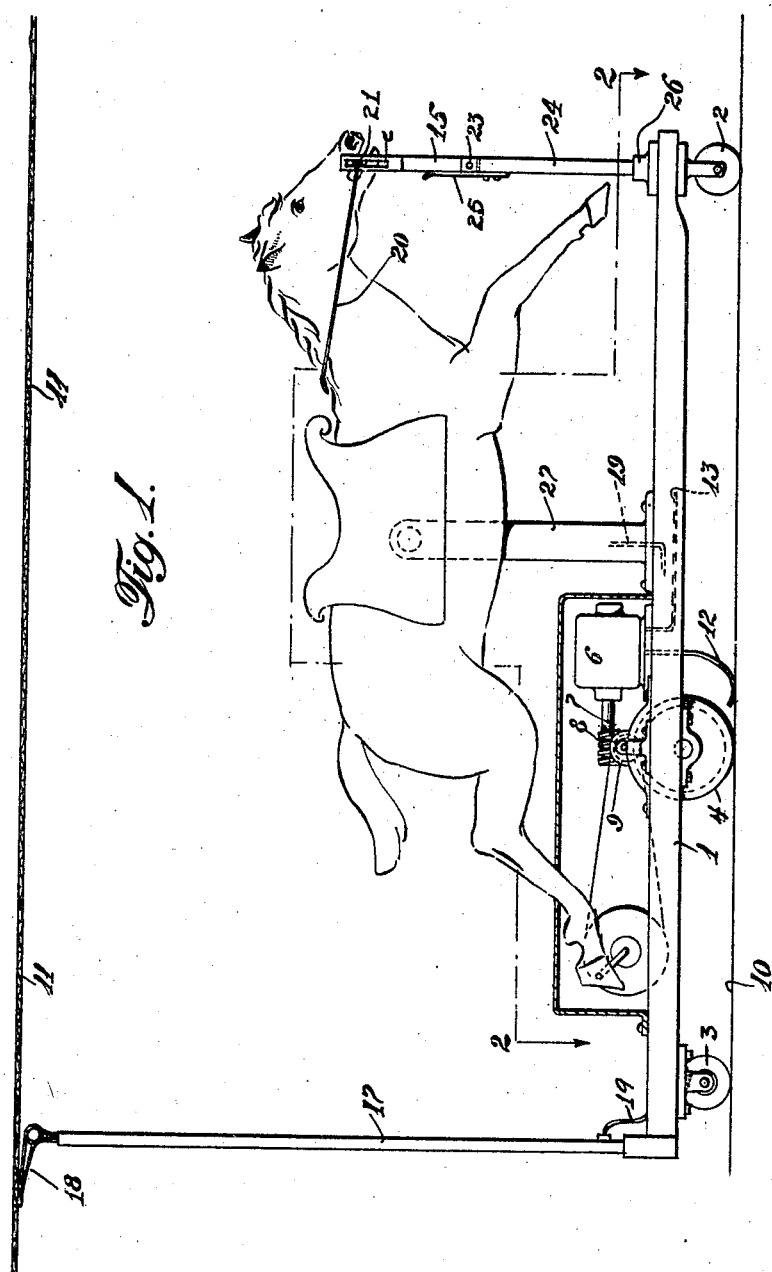
Inventor
Charles J. Geiser
By his Attorney
H. Lee Helms April 8, 1924.
C. J. GEISER
AMUSEMENT DEVICE
Original Filed Sept. 28, 1922  2 Sheets-Sheet 2
1,489,701
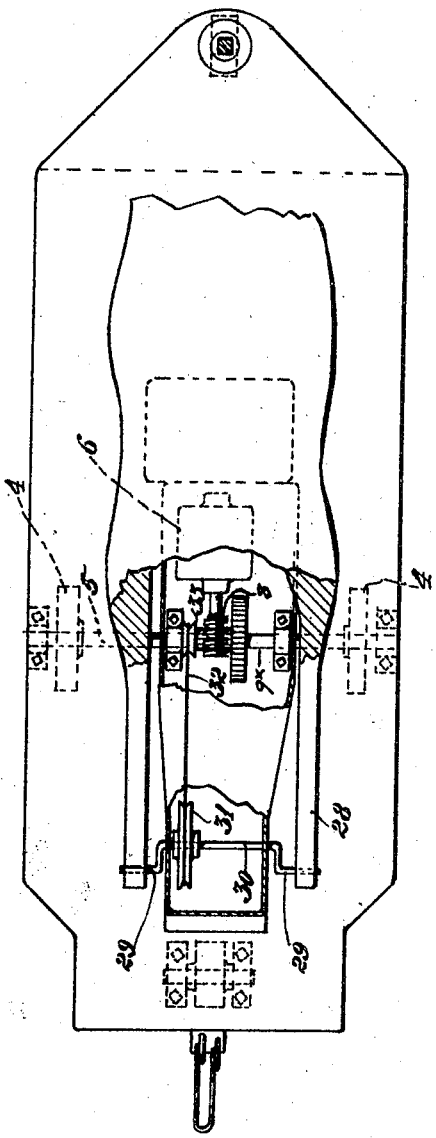
Inventor
Charles J. Geiser
By his Attorney Patented Apr. 8, 1924.

1,489,701

UNITED STATES PATENT OFFICE.

CHARLES J. GEISER, OF BROOKLYN, NEW YORK.

AMUSEMENT DEVICE.

Application filed September 28, 1922, Serial No. 591,036. Renewed February 8, 1924.

*To all whom it may concern:*

Be it known that I, CHARLES J. GEISER, a citizen of the United States, residing in Brooklyn, county of Kings, and State of New York, have invented certain new and useful Improvements in Amusement Devices, of which the following is a specification.

My invention relates to that class of amusement devices adapted for use at summer resorts, the device being an electrically-driven horse, capable of being stopped and started at the will of the rider, and being steered by reins, the horse having the rocking and forward motion of the animal itself.

The invention will be understood by reference to the accompanying drawings, in which—

Fig. 1 is a side elevation of a device constructed in accordance with the invention.

Fig. 2 is a plan view thereof, partly in section, on the line 2—2, Fig. 1.

Fig. 3 is a side detail view of the electrical switch and steering-connections, and Fig. 4 is a front view of the same in elevation.

It will be seen that the device comprises a truck 1, having a centrally disposed forward steering wheel 2, a rear central supporting wheel 3, and driving wheels 4 fixed upon a drive-axle 5. Axle 5 is rotated by a motor 6. For this purpose the motor shaft 7 is provided with a worm 8 which engages a worm wheel 9 on a short shaft 9$^x$ and shaft 9$^x$ is geared to axle 5 in any suitable manner.

Truck 1 is intended to run upon a metal floor 10 which serve as one primary conductor for the electrical current. The second primary conductor is an overhead wire netting 11. To one terminal of motor 6 is connected a contact shoe 12 which engages floor 10. To the second terminal of the motor is connected a conductor-wire 13 which is led in any suitable manner to terminal 14, (Fig. 3) of a switch 15 disposed within the mouth of the horse. The truck supports at its rear end a trolley pole 17 provided with a trolley contact 18 which engages the wire-netting primary conductor 11. The current is led from the pole 17 to a conducting wire 19 of which a fragment is shown in Fig. 1. Conductor-wire 19 leads through the body of the horse and is connected to terminal 16 of switch 15. The switch is of a usual type having a spring plunger 16$^x$ thus when the plunger 16$^x$ is moved rearwardly the motor is energized and driving wheels 4 are rotated to propel the device forwardly.

The switch plunger is actuated by a pull upon reins 20. Reins 20 are connected to studs 21 on a "bit" $b$ movable in vertical slots $c$ of arms 22 of a yoke 22$^x$ carried at the upper end of steering member 15. Steering member 15 is pivoted at 23 to steering shaft 24 so that it may have forward and backward motion, the backward movement, which serves to close the switch being opposed by a plate spring 25 carried by steering shaft 24. Steering shaft 24 projects through a bearing sleeve 26 carried by the truck 1, and at its lower end carries the steering wheel 2, as shown in Fig. 1.

It will be seen by reference to Fig. 4 that yoke arms 22$^x$ are each disposed some distance to the side of the head of the horse so that when one rein is pulled upon, the yoke may be turned and with it the steering shaft and steering wheel carried thereby. In this manner the device may be guided in its forward motion as desired by the rider.

The body of the horse is pivotally mounted upon a supporting standard 27, and each rear leg of the horse is connected to a crank arm 29 on a shaft 30. Shaft 30 carries a pulley wheel 31 driven by a belt 32 which is led over a driving pulley 33 mounted on shaft 9$^x$. Thus as the horse moves forward it is given a lifelike motion upon the truck which supports it.

It will be understood that various modifications may be made in the form of the device illustrated in the drawings without departing from the spirit of my invention, what I claim and desire to secure by Letters Patent being as follows:

1. In an amusement device, in combination, a wheeled truck, an animal figure pivotally mounted on the truck, an electric motor, operative connections between the motor and a driving wheel of the truck, means driven by the motor for rocking the animal figure, a steering shaft operatively connected to a steering wheel of the truck, reins leading from the mouth of the animal and operatively connected to the steering shaft, contact plates normally separated to open the circuit through the motor, and means operated by said reins to close the circuit by bringing said plates into mutual contact.

2. In an amusement device, in combination, an animal figure mounted for forward propulsion, a steering device for said figure, an electric motor and means driven by the motor for propelling the figure, reins leading to the mouth of the figure and operatively connected to the steering device, and a circuit-breaker for the motor operatively connected to said reins.

3. In an amusement device, in combination, an animal figure mounted for forward propulsion, a steering device for said figure, including a shaft-member having an oscillating and a rocking motion, a spring for resisting said rocking motion of the shaft-member, contact devices carried by the head of the animal figure, a motor and means driven thereby for propelling the figure and electrically connected with said contact devices, and a device adapted to simultaneously hold said contacts in engagement and actuate said steering device.

In testimony whereof I have signed my name to this specification in the presence of two subscribing witnesses.

CHARLES J. GEISER.

Witnesses:
W. LEE HELMS,
ALBERT T. WEIGOLD.